United States Patent [19]

Mugikura

[11] Patent Number: 4,877,105

[45] Date of Patent: Oct. 31, 1989

[54] REAR SPEAKER UNIT FOR A MOTOR VEHICLE

[75] Inventor: Norio Mugikura, Wako, Japan

[73] Assignee: Honda Giken Kogyo Kabushiki Kaisha, Tokyo, Japan

[21] Appl. No.: 241,730

[22] Filed: Sep. 7, 1988

[30] Foreign Application Priority Data

Sep. 8, 1987 [JP] Japan .................. 62-136195[U]

[51] Int. Cl.⁴ ............................................. H05K 5/00
[52] U.S. Cl. ................................. 181/141; 181/153; 181/154; 381/86; 381/205
[58] Field of Search ................. 181/141, 153, 154; 381/86, 205

[56] References Cited

U.S. PATENT DOCUMENTS

| | | | |
|---|---|---|---|
| 3,883,962 | 5/1975 | Ripple | 181/154 |
| 4,567,959 | 2/1986 | Prophit | 181/141 X |
| 4,594,729 | 6/1986 | Weingartner | 381/86 X |
| 4,655,315 | 4/1987 | Saville | 181/153 |

Primary Examiner—B. R. Fuller
Attorney, Agent, or Firm—Armstrong, Nikaido, Marmelstein, Kubovcik & Murray

[57] ABSTRACT

A rear speaker unit for a motor vehicle is disposed in an elongate space such as a space which is defined between one of opposite sides of a rear seat and a vehicle body side panel. The speaker unit is made up of a tubular and substantially cylindrical speaker box and a speaker which is supported by the front end of the speaker box. The speaker box is elongate in the longitudinal direction of the vehicle body and has a front end portion which is so bent as to face the center of a passenger compartment of the vehicle. Hence, the speaker mounted on the front end of the speaker box also faces the center of the passenger compartment.

5 Claims, 4 Drawing Sheets

REAR SPEAKER UNIT FOR A MOTOR VEHICLE

BACKGROUND OF THE INVENTION

The present invention relates to rear speaker units which are located at laterally opposite sides of a rear part of a passenger compartment which is defined in a motor vehicle and, more particularly, to rear speaker units for use with a motor vehicle each having a speaker box.

Rear speakers of a motor vehicle are often directly mounted on a rear shelf, linings of side panels or similar structural elements of the vehicle body. Mounting speakers directly on such panels is disadvantageous from the acoustics standpoint, i. e., the panels themselves are caused to oscillate to produce noise and, moreover, the speakers are necessarily oriented upward or in the lateral direction of the vehicle body at the sacrifice of acoustic effects.

To enhance acoustics, a speaker unit having a speaker box at the rear of a speaker has been proposed for use with a motor vehicle. Generally, this kind of speaker unit is disposed on the upper surface of a rear shelf. It is preferable that such a speaker unit be provided with a speaker box having a large capacity in order to enhance the acoustic characteristics, particularly low frequency characteristic. However, since the speaker unit is mounted on a rear shelf as stated above, a large speaker box would not only obstruct the rear view of the vehicle but also show itself to the outside of the passenger compartment to impair the appearance. It is therefore necessary to limit the capacity of the speaker box at the cost of acoustics.

Dead spaces are usually available in the passenger compartment of a motor vehicle such as those spaces which are defined between opposite side panels of the vehicle body and laterally opposite sides of a rear seat. Accommodating speaker boxes in such dead spaces would increase the effective space available in the passenger compartment while insuring attractive external appearance of the vehicle. However, since dead spaces of the kind described are generally elongate in the longitudinal direction of the vehicle body, ordinary speaker boxes cannot be increased in capacity beyond a certain limit. In addition, when ordinary speaker boxes are received in such dead spaces, speakers associated therewith face the front end of the vehicle body due to the fact that the dead spaces are defined at the laterally opposite sides of the passenger compartment. This disturbs the balance of sounds which are emitted from the opposite rear speakers toward vehicle occupants and thereby degrades the acoustic effects.

SUMMARY OF THE INVENTION

It is therefore an object of the present invention to provide a speaker unit including a speaker box which has a relatively large capacity and yet can be accommodated in a dead space within the passenger compartment of a motor vehicle.

It is another object of the present invention to provide a rear speaker unit which has desirable acoustic characteristics despite that it is disposed at the right- or left-hand side of the passenger compartment of a motor vehicle.

It is a farther object of the present invention to provide an extremely rigid and light weight speaker box.

A rear speaker unit for a motor vehicle of the present invention includes a speaker box located at a rear side portion of the passenger compartment of the vehicle to extend in a longitudinal direction of the vehicle body. The speaker box is provided with an opening at its front end and has a front end portion which is bent toward the center of the passenger compartment. A speaker is mounted in the opening of the speaker box.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
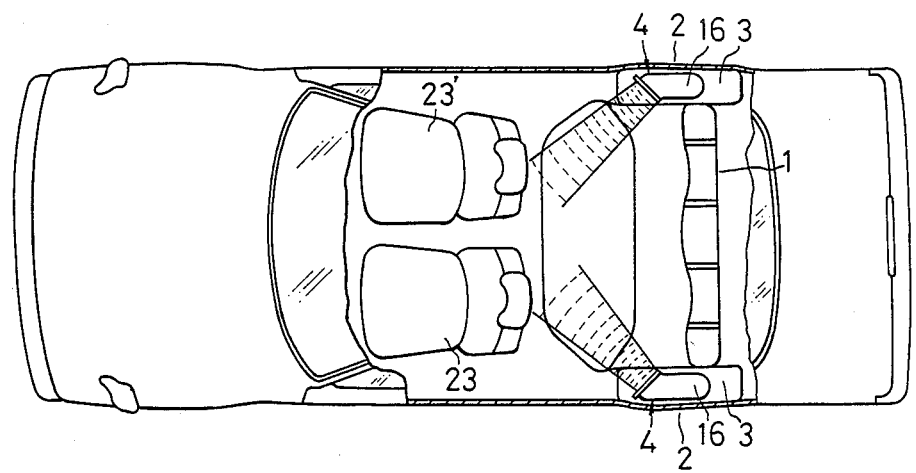
FIG. 1 is a partly taken away top plan view of a motor vehicle in which rear speaker units embodying the present invention are installed.

As shown in FIG. 1, a motor vehicle has a passenger compartment in a rear part of which a rear seat 1 is located. Rear wheel houses 3 are individually defined by laterally opposite ends of the rear seat 1 and opposite side panels 2 of the vehicle body which are adjacent to the rear seat. An elongate space extends above each of the rear wheel houses 3 in the longitudinal direction of the vehicle body. Speaker units 4 are each disposed in a respective one of the elongate spaces above the wheel houses 3 and are configured symmetrically to each other in the lateral direction of the vehicle body.

Figure 2:
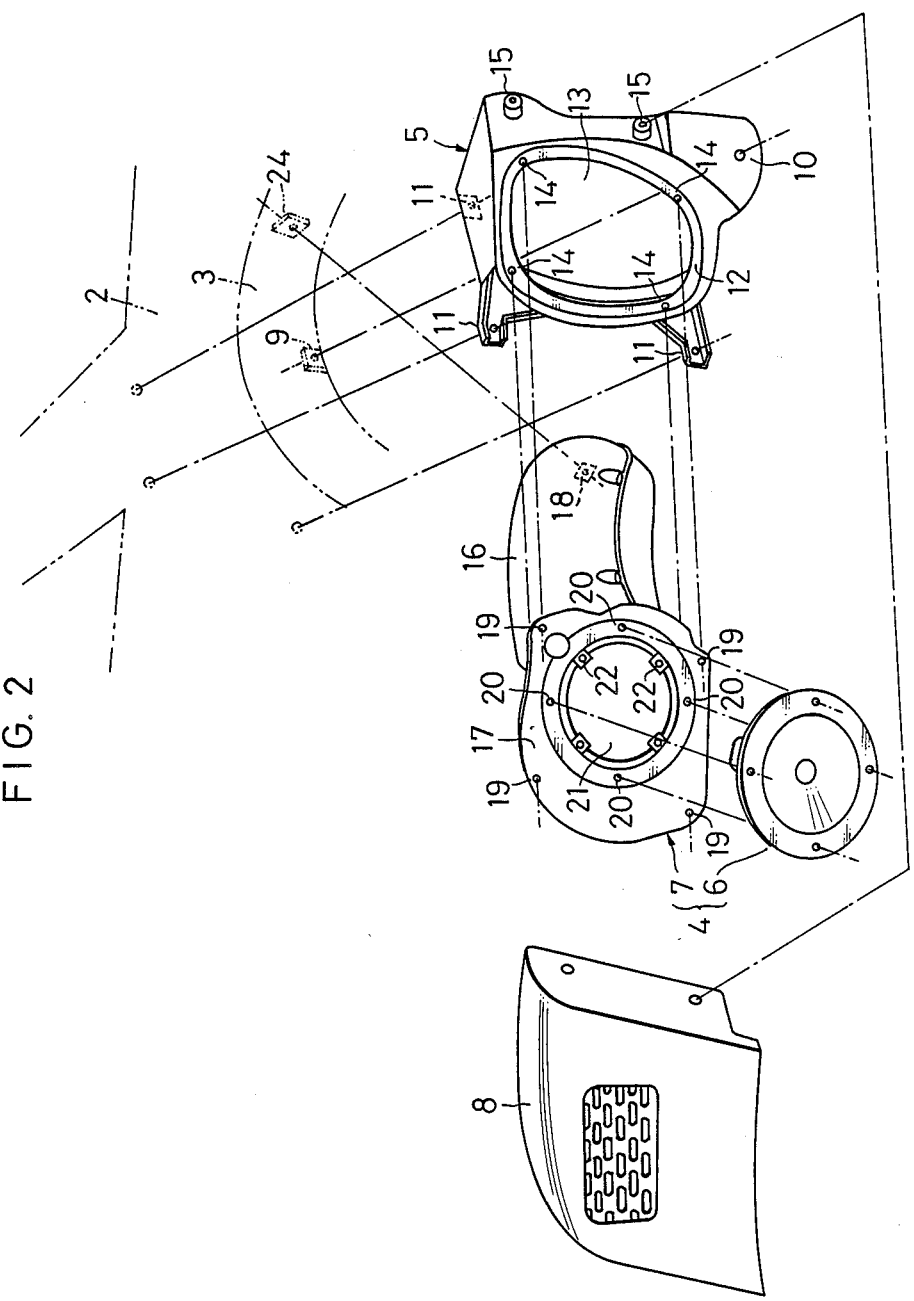
FIG. 2 is an exploded perspective view of one of the rear speaker units which is located at the right-hand side of the vehicle body.
Figure 3:
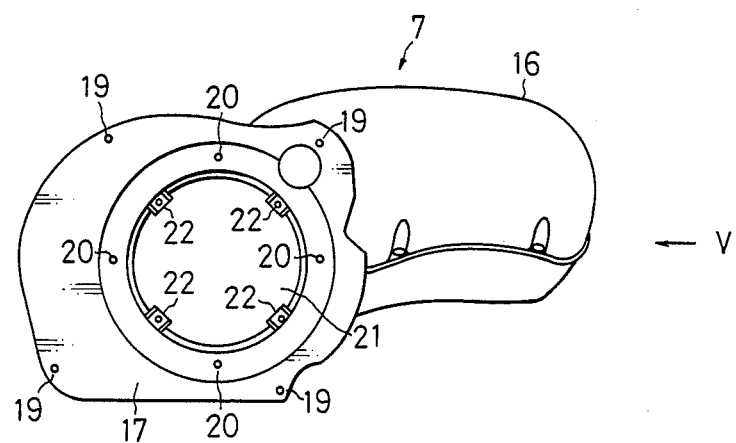
FIG. 3 is a front view of a speaker box of the rear speaker unit which is shown in FIG. 2, particularly an opening which is formed through the speaker box.

FIG. 2 shows the speaker unit 4 which is mounted at the right-hand side of the vehicle body. As shown, the speaker unit 4 is made up of a speaker 6 and a speaker box 7 and is fixed to the side panel 2 and wheel house 3 through a bracket 5. A lid 8 is mounted on the bracket 5 to cover the front end of the speaker unit 4. Having a rear-open case-like configuration, the bracket 5 is formed with an aperture 10 through a lower portion of its inner side wall. A mounting member 9 extends upright from an inner end portion of the upper surface of a forwardly inclined section of the wheel house 3, the bracket 5 being fixed to the mounting member 9 by using the aperture 10. The bracket 5 is further provided at its outer end with three fixing portions 11 which are to be fixed to the side panel 2. The front end of the bracket 5 is inclined such that it faces the center of the passenger compartment when mounted on the vehicle body as stated above. A relatively large opening 13 is formed through the front end of the bracket 5 and surrounded by a surface 12 which is adapted to support the speaker unit 4. Four apertures 14 are formed through the support surface 12 of the bracket 5 for mounting the speaker box 7. A pair of bosses 15 are provided one above the other on the inner side surface of the bracket 5 to mount the lid 8.

Figure 4:
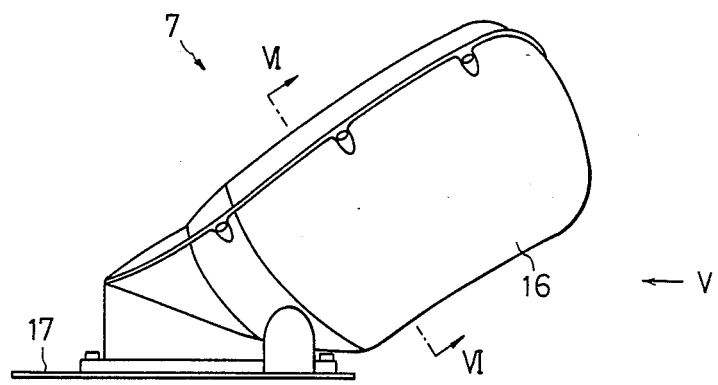
FIG. 4 is a plan view of the speaker box.
Figure 5:
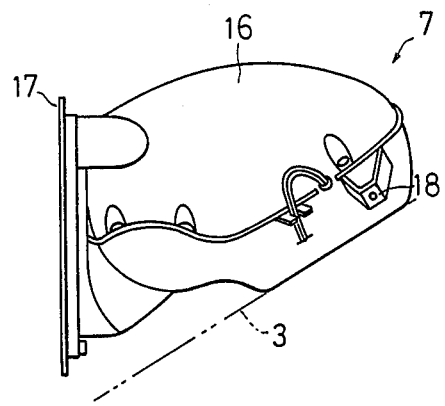
FIG. 5 is a side elevation of the speaker box as seen in a direction which is indicated by an arrow V in FIGS. 3 and 4.
Figure 6:
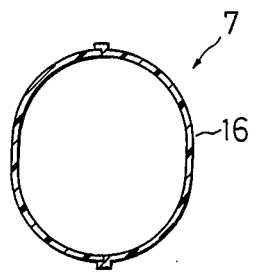
FIG. 6 is a section along line VI—VI of FIG. 4.

As shown in FIGS. 3 to 6, the speaker box 7 is constituted by a tubular body 16 which is open at the front end and closed at the rear end, and a flange 17 provided at the front end of the body 16. The body 16 is elongate in the axial direction and, as shown in FIG. 4, bent leftward in a horizontal plane in a front end portion thereof. A rear part of the body 16 which extends from such a bent portion is slightly curved in a plan view. Further, as shown in FIG. 5, the rear part of the body 16 is curved upward and then downward. A mounting member 18 is rigidly mounted on the rear end of the body 16 for mounting the speaker box 7 on the vehicle body. The speaker box 7 is made of a resin. As shown in FIG. 6, the body 16 has a generally circular cross-section.

The flange 17 of the speaker box 7 is formed with four apertures 19 in its peripheral portion for mounting the bracket 5, and four first apertures 20 which are available for mounting the speaker 6. The apertures 20 are positioned closer to the center of the flange 17 than the apertures 19 and at substantially equally spaced locations along a circumference which is coaxial with a front opening 21 of the speaker box 7. The flange 17 is further formed with four second apertures 22 which are also available for mounting the speaker 6, the second apertures 22 being closer to the center of the flange 17 than the first apertures 20. The apertures 22, like the apertures 20, are positioned at substantially equally spaced locations along a circumference which is coaxial with the front opening 21. The speaker 6 is mounted on the speaker box 7 by using either the first aperture 20 or the second apertures 22, i. e., any of two kinds of speakers each having a different diameter may be mounted on the speaker box 7 as desired.

To assemble the speaker unit 4, a rear end portion of the speaker 6 is inserted in the front opening 21 of the speaker box 7 until a flange of the former abuts against the flange 17 of the latter. After the first apertures 20 or the second aperture 2 of the speaker box 7 have been aligned with apertures which are formed through the flange of the speaker 6, the speaker is securely connected to the speaker box 7 by using screws or similar fastening means.

The speaker unit 4 assembled as described above is mounted on the vehicle body by the following procedure. The bracket 5 is placed on the wheel house 3 and, then, apertures formed through the fixing portions 11 of the bracket 5 are individually aligned with apertures of the side panel 2. In this condition, the bracket 5 is fastened to the side panel 2 by screws or the like. At the same time, the aperture 10 of the bracket 5 is aligned with an aperture which is formed though the mounting member 9 provided on the wheel house 3, whereafter the bracket 5 is fastened to the mounting member 9 by a screw or similar fastening means. By the steps described so far, the bracket 5 is securely mounted on the side panel 2 and wheel house 3. In this instance, the surface 12 of the bracket 5 adapted to support the speaker unit 4 is oriented toward the center of the passenger compartment, i. e., toward a left front seat 23.

Subsequently, the body 16 of the speaker box 7 which carries the speaker 6 therewith is inserted through the opening 13 of the bracket 5 into the elongate space which is defined between the rear seat 1 and the side panel 2, until the flange 17 of the speaker box 7 abuts against the surface 12 of the bracket 5. After the apertures 19 of the speaker box 7 have been individually aligned with the apertures 14 of the bracket 5, the speaker box 7 and the bracket 5 are fastened together by screws or similar fastening means.

During the procedure described above, the opening 13 and support surface 12 of the bracket 5 are inclined with respect to the longitudinal direction of the vehicle body. Nevertheless, since the front end portion of the speaker box 7 is bent as previously mentioned, the speaker box 7 can be located in the space between the rear seat 1 and the side panel 2 without interfering with the side panel 2 and other members simply by forcing it into that space along its lengthwise direction. This also allows the flange 17 of the speaker box 7 to abut against the support surface 12 immediately. Further, although the support surface 12 is positioned in the forwardly inclined portion of the wheel house 3, the body 16 of the speaker box 7 which is curved in the up-down direction as stated earlier is allowed to extend along the upper surface of the wheel house 3, as shown in FIG. 5.

After the speaker unit 4 has been securely mounted on the bracket 5 which had been fastened to the vehicle body, the mounting member 18 provided at the rear end of the speaker box 7 is fixed to a mounting member 24 which extends upright from a rear portion of the wheel house 3 by using a screw or the like. In this manner, the speaker unit 4 is rigidly connected to the vehicle body in the space which is defined above the wheel house 3 and between the rear seat 1 and the side panel 2. Finally, the lid 8 is mounted on the bracket 5 in such a mannner as to cover the front end of the speaker 6 and then fastened to the bosses 15 of the bracket 5 by screws, for example. In this construction, the speaker box 7 extends in the longitudinal direction of the vehicle body at the right-hand side of the rear part of the passenger compartment, and the speaker 6 received in the opening 21 of the speaker box 7 faces the left front seat 23.

The other or left speaker unit 4 is constructed and arranged in the same manner as the right speaker unit 4 described above, except that the former is configured symmetrically to the latter in the lateral direction of the vehicle body. Hence, the left speaker unit 4 faces a right front seat 23' when mounted on the vehicle body.

With the above construction, the speaker unit 4 achieves various advantages as enumerated below.

(1) Since the speaker box 7 is elongate in the longitudinal direction of the vehicle body, it can be provided with a sufficiently large capacity which is preferable from the acoustics standpoint, especially low frequencies standpoint.

(2) The speaker box 7 is accommodated in an elongate dead space which is defined between one side of the rear seat 1 and the vehicle body side panel 2 in the longitudinal direction of the vehicle body. This promotes effective use of such a dead space and thereby increases the effective space available in the passenger compartment.

(3) Even though the speaker box 7 may have a relatively large capacity, it is not conspicuous because the speaker unit 4 is disposed in the dead space. Hence, not only the external appearance is improved but also the obstruction to the rear view is eliminated.

(4) The front ends of the right and left speaker units 4 face respectively the left and right front seats 23 and 23' so that sound waves from the speaker units 4 cross each other at the rear of the front seats 23 and 23' to enhance the acoustics. This is especially true when front speaker units are provided in the passenger compartment in addition to the rear speaker units 4.

(5) Due to the tubular and substantially cylindrical configuration, the speaker box 7 has great mechanical strength and plane rigidity and therefore is prevented from oscillating, insuring desirable acoustic characteristics during, among the others, high power operation. The speaker box 7 is inexpensive and light weight because it is implemented by a molding of plastic.

(6) The speaker unit 4 is mounted on the vehicle body through the bracket 5 which is so inclined as to face the inside of the passenger compartment. This not only allows the flange 17 of the speaker box 7 to be uniformly supported and thereby insures firm support for the speaker 6 but also promotes the ease of mounting and dismounting the speaker unit 4 to thereby facilitate maintenance.

Various modifications will become possible for those skilled in the art after receiving the teachings of the present disclosure without departing from the scope thereof.

What is claimed is:

1. A rear speaker unit for a motor vehicle, comprising:
    a speaker box located at a rear side portion of a passenger compartment of said vehicle to extend in a longitudinal direction of a vehicle body of said vehicle, said speaker box being provided with an opening at a front end of said speaker box and having a front end portion which is bent toward a center of said passenger compartment; and
    a speaker mounted in said opening of said speaker box.

2. A rear speaker unit as claimed in claim 1, wherein said speaker box is tubular and has a substantially circular cross-section.

3. A rear speaker unit as claimed in claim 1, wherein said speaker box is disposed in a space which is defined above a wheel house and between a rear seat and a side panel of said vehicle body.

4. A rear speaker unit as claimed in claim 3, wherein said speaker box is curved in an up-down direction to extend along an upper surface of said wheel house.

5. A rear speaker unit as claimed in claim 1, wherein said speaker box is provided with a flange around said opening and mounted on said vehicle body through a bracket having a support surface which is inclined toward the center of said vehicle body, said flange of said speaker box abutting against said support surface of said bracket.

* * * * *